(12) United States Patent
Buse

(10) Patent No.: US 7,614,922 B1
(45) Date of Patent: Nov. 10, 2009

(54) QUICK ATTACHMENT JUNCTION BOX

(75) Inventor: John Jeffrey Buse, Mooreville, MS (US)

(73) Assignee: Genlyte Thomas Group LLC, Burlington, MA (US)

( * ) Notice: Subject to any disclaimer, the term of this patent is extended or adjusted under 35 U.S.C. 154(b) by 0 days.

(21) Appl. No.: 12/033,344

(22) Filed: Feb. 19, 2008

(51) Int. Cl.
*H01R 11/09* (2006.01)
(52) U.S. Cl. .................................. 439/787; 439/439
(58) Field of Classification Search .............. 439/787, 439/789, 826, 439, 786, 721, 722, 465; 174/60, 174/59, 50.54
See application file for complete search history.

(56) References Cited

U.S. PATENT DOCUMENTS

| | | | | |
|---|---|---|---|---|
| 2,463,033 A | * | 3/1949 | Harnett | 439/721 |
| 2,463,034 A | * | 3/1949 | Harnett | 439/717 |
| 2,699,533 A | * | 1/1955 | Harnett | 439/717 |
| 3,585,570 A | * | 6/1971 | Jans | 439/439 |
| 4,985,962 A | * | 1/1991 | Weber | 16/232 |
| 5,212,346 A | * | 5/1993 | Clark | 174/59 |
| 5,378,174 A | * | 1/1995 | Brownlie et al. | 439/709 |
| 5,774,980 A | * | 7/1998 | Klein et al. | 29/857 |
| 7,339,121 B2 | * | 3/2008 | Krauss | 174/541 |

* cited by examiner

*Primary Examiner*—Hae Moon Hyeon

(57) ABSTRACT

A quick attachment junction box is provided that simplifies the installation of electrical wires into the junction box and minimizes the tools and parts necessary for proper installation. A connection element is provided to allow for quick connection of electrical wires, and frictional contact from detachably connected upper and lower casings of the junction box provide strain relief for any connected wires, when the upper and lower casings are secured in their closed position. Additionally, a wire capture sleeve is provided that can electrically isolate the connection element and maintain the connection element in place.

27 Claims, 5 Drawing Sheets

QUICK ATTACHMENT JUNCTION BOX

FIELD OF INVENTION

The present invention is related generally to electrical junction boxes and more specifically to junction boxes which provide for quick, convenient connection of wires and quick, convenient strain relief for those wires.

DESCRIPTION OF RELATED ART

Various electrical products are provided or have been provided that contain a quick connection apparatus.

There is a need, however, for a junction box having a quick connection apparatus housed in a sleeve, two detachably connected portions, and a simple strain relief mechanism formed when the detachably connected portions are in the closed position. Such a device simplifies the installation of electrical wires into junction boxes and minimizes the tools and parts necessary for proper installation.

SUMMARY OF THE INVENTION

The present invention allows a user in the field to easily install electrical wires into junction boxes with minimum tools.

Therefore, a general object of this invention is to provide a junction box having a connection element, two detachable portions, and a simple strain relief mechanism formed when the detachable portions are in the closed position. A junction box is described for quick wire attachment having an open interior area, a wire capture sleeve vertically mounted in the aid junction box and having a keyed internal space and a plurality of apertures extending through the sleeve, at least one keyed quick connection element removably received within the keyed internal space of the sleeve to prevent rotating of the quick connection elements and also having apertures positionally matching said plurality of apertures of the sleeve.

An additional object of this invention is to provide a connection element that can be inserted into a wire capture sleeve internally located in a junction box.

An additional object of this invention is to provide a junction box having a casing element, a connection element, a wire capture sleeve, and a strain relief element. To achieve these and other objectives of the present invention which are not set forth herein is described a junction box device having a casing element, the casing element formed from a non-conductive material and having an upper base portion, a lower base portion, and a sidewall in between, the sidewall containing one or more apertures sized to receive electrical wiring, the casing element being separable along the sidewall into an upper casing and a lower casing, a connection element, the connection element being internal to the casing element and having one or more quick connection elements, each the quick connection elements being constructed from a conductive material and being electrically isolated from any adjacent quick connection element and containing a plurality of electrically connected wire receiving apertures, a wire capture sleeve, the wire capture sleeve being retained by and non-rotatably mounted in the casing element and constructed from an insulating material, the wire capture sleeve substantially surrounding the connection element and shaped to prevent rotational movement of the connection element, the wire capture sleeve having apertures substantially corresponding with the location of each the wire receiving aperture of each the quick connection element, wherein the apertures of the wire capture sleeve are sized to allow a single electrical wire to pass therethrough.

Other objects and advantages of this invention will become apparent from the following description taken in connection with the accompanying drawings, wherein is set forth by way of illustration and examples, embodiments of this invention.

DETAILED DESCRIPTION

Figure 1:
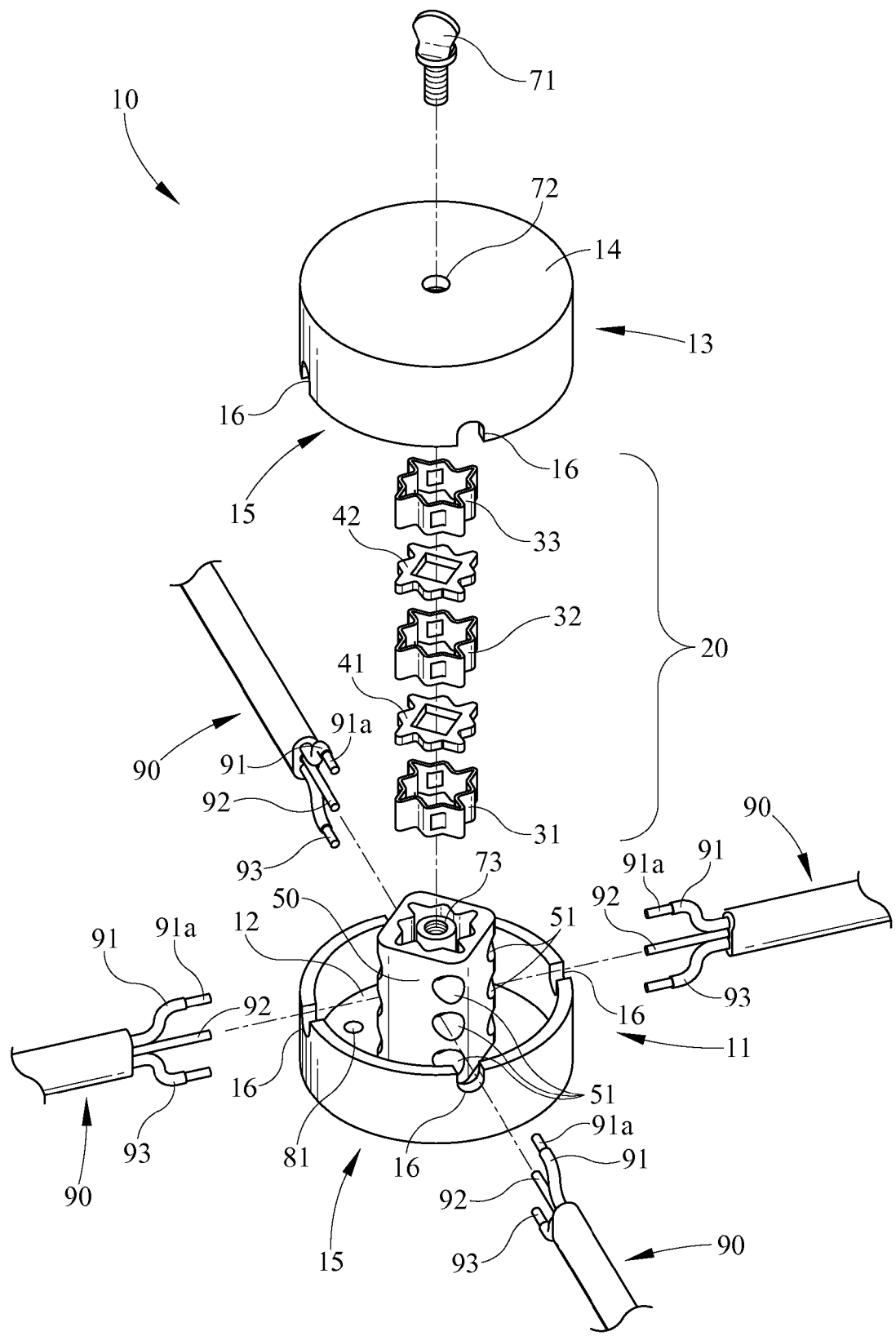
FIG. 1 is an exploded, top perspective view of the quick attachment junction box of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Figure 3:
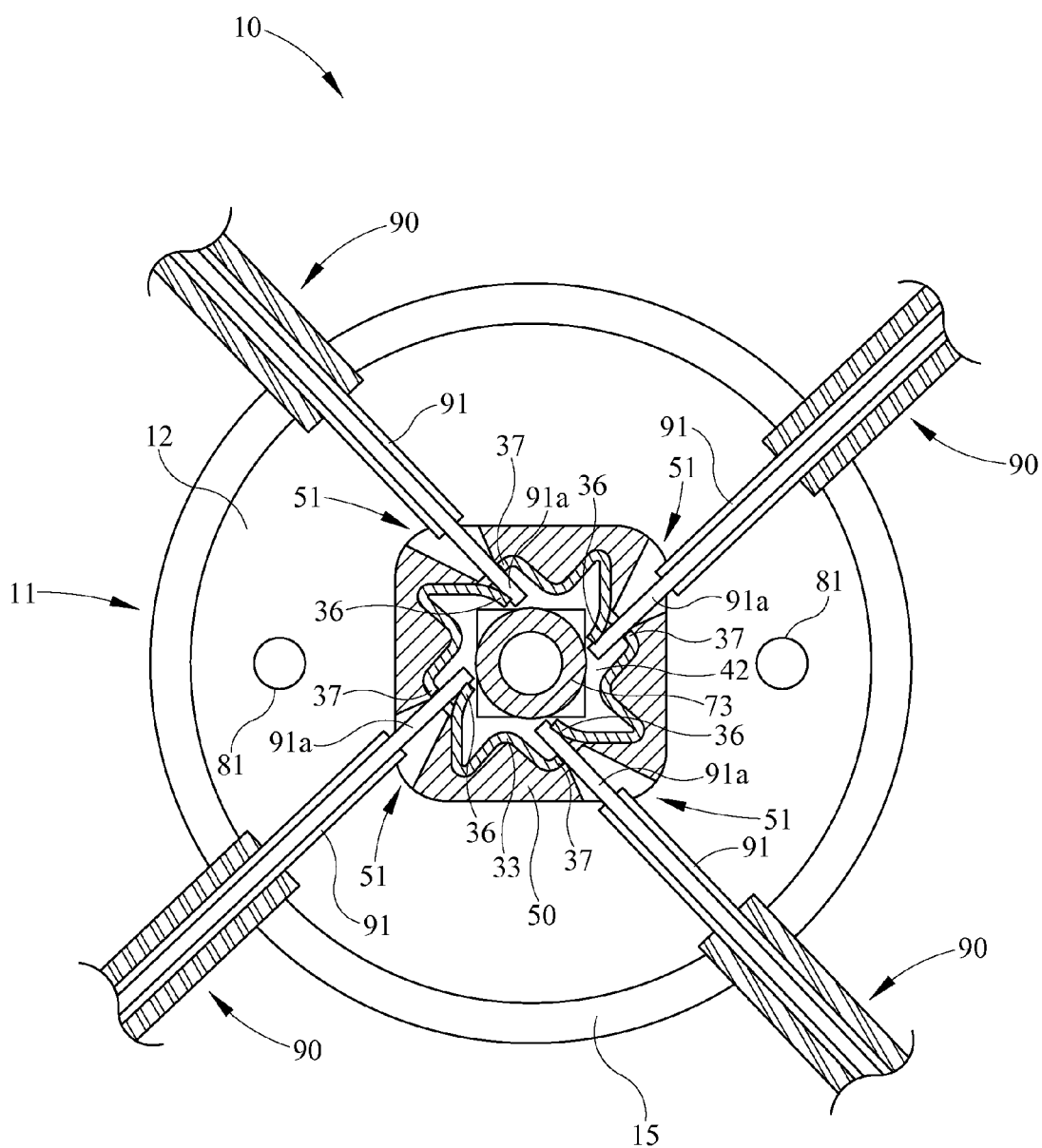
FIG. 3 is a downward sectional view of the wire capture sleeve and connection element of the quick attachment junction box of the present invention.

A quick attachment junction box 10 of the present invention contains a connection element 20, shown in FIG. 1. Connection element 20 shown has three separate quick connection elements, a lower quick connection element 31, a middle quick connection element 32, and an upper quick connection element 33. Connection element 20 shown also has two separate insulating materials, a lower insulating material 41 and an upper insulating material 42. Lower quick connection element 31 is electrically isolated from middle quick connection element 32 by lower insulating material 41 and middle quick connection element 32 is electrically isolated from upper quick connection element 33 by upper insulating material 42. Quick connection elements 31, 32, and 33 are constructed from a conductive material and have a plurality of wire receiving apertures, each capable of receiving a single electrical wire. As shown in FIG. 3, the wire conductor 91a of an electrical wire 91, which forms part of an electrical conduit 90, can be inserted through a receiving aperture 51 of a wire capture sleeve 50 and into a wire receiving aperture of quick connection element 33, formed by a flexible large arm 36 and a more rigid small arm 37. Inserting the wire in the wire receiving aperture of quick connection element 33 forces large arm 36 to flex and causes the wire conductor 91a of electrical wire 91 to be wedged between large arm 36 and small arm 37. Once wedged, the free end of large arm 36 comes into frictional contact with wire conductor 91a of electrical wire 91 and prevents its removal. Thus, wire conductor 91a of electrical wire 91 is held in contact with large arm 36 and small arm 37, and is in electrical contact with the entirety of the quick connection element 33 to which it is connected. To remove electrical wire 91, a rigid, properly sized tool can be inserted through receiving aperture 51 adjacent to wire conductor 91a and pressed against large arm 36, causing the large arm edge to disengage from wire conductor 91a and allowing for wire 91 to be removed. Alternatively, separate removal apertures can be provided in wire capture sleeve 50, adjacent to receiving apertures 51 to allow access to large arm 36 of any quick connection element and enable removal of any attached wire from electrical conduit 90. Wires 92 and 93 and their respective wire conductors of any conduit 90 can be similarly inserted, retained, and removed in quick connection elements 32 and 33, respectively, of connection element 20.

Although not necessary, wire capture sleeve 50 preferably surrounds connection element 20, as most clearly illustrated in FIG. 1. Wire capture sleeve 50 is constructed from a non-conductive material and may be integral with, or attached to, lower casing 11. Wire capture sleeve 50 is shaped to substantially surround connection element 20 and to be in contact with, or close proximity to, an upper casing 13, when lower casing 11 and upper casing 13 are in their attached state. Receiving apertures 51 are provided in wire capture sleeve 50 and are located to substantially correspond in position with the wire receiving apertures of connection element 20. Receiving apertures 51 allow for wires to pass through wire capture sleeve 50 and be received in the wire receiving apertures of quick connection elements 31, 32, and 33 of connection element 20. Receiving apertures 51 can be positioned and sized to accept any inserted wire from conduit 90 and still allow any quick release mechanism associated with quick connection elements 31, 32, and 33 of connection element 20 to be accessible. Alternatively, a separate removal aperture could be provided in wire capture sleeve 50 to allow access to any removal apertures of quick connection elements 31, 32, and 33 of connection element 20. Wire capture sleeve 50 electrically isolates connection element 20 from contact with exterior items, preventing shorts and other unintended electrical connections. Wire capture sleeve 50 also provides structural support for connection element 20 and maintains a removable or non-removable connection element 20 in a relatively constant position within quick attachment junction box 10.

For example, as shown in FIG. 1, connection element 20 can be removable by being unattached to any portion of quick attachment junction box 10, but maintained within quick attachment junction box 10 by insertion into wire capture sleeve 50. Thus, connection element 20 would be confined to an area formed by lower and upper support bases 12 and 14 and wire capture sleeve 50, when quick attachment junction box 10 is in the closed position. Lower and upper support bases 12 and 14 restrict vertical movement of connection element 20, while wire capture sleeve 50 restricts rotational movement of connection element 20. As shown in FIG. 1, quick connection elements 31, 32, and 33 and insulating sections 41 and 42 of connection element 20 may be separable. Thus, connection element 20 may be formed by sequentially inserting lower quick connection element 31, lower insulating material 41, middle quick connection element 32, upper insulating material 42, and upper quick connection element 33 into wire capture sleeve 50. Alternatively, quick connection elements 31, 32, and 33 and insulating sections 41 and 42 may be attached to form an integral connection element 20, which can be inserted into wire capture sleeve 50 as one unit.

Of course, connection element 20 of the present invention shown can vary in many respects from the element illustrated and described. First, connection element 20 is by no means limited to the shape shown, the amount of separate quick connection elements shown, or the amount of insulating materials shown. To accommodate different electrical needs, it could just as easily have only one quick connection element, two quick connection elements, or four or more quick connection elements. Additionally, the number of insulating materials could likewise vary, or insulating material could be integrally formed on one or more quick connection elements. Similarly, connection element 20 is not limited to its current shape and could be square, rectangular, octagonal, or a variety of other shapes. If different shapes are used for connection element 20, the shape of the internal portion of wire capture sleeve 50 can be adjusted to substantially correspond. Wire capture sleeve 50 could similarly be adjusted to accommodate more or less quick connection elements. Additionally, a number of apparatuses for securing electrical wires have been utilized in electrical junction boxes specifically and more generally in wire capture systems that provide for easy electrical connection of a plurality of wires. Therefore, the apparatus used for securing electrical wires in the quick connection elements of the present embodiments is not limited to wedging electrical wires from electrical conduit 90 between small arm 37 and large arm 36. Rather, the apparatus encompasses a broad range of securing methods and apparatuses as is known in the art. These alternative wire securing apparatuses still enable quick connection elements to receive and secure electrical wires by insertion of the wires in or through an aperture and any of them could be implemented into the quick connection elements in various embodiments of the present invention as is known in the art. The quick connection elements may need to be modified to accommodate these quick wire securing apparatuses and may comprise more than one layer of conductive metal or have other alterations if a particular quick wire securing apparatus so requires.

Additionally, quick connection elements 31, 32, and 33 of connection element 20 could contain more or fewer wire receiving apertures than depicted, as well as separate removal apertures. Likewise, connection element 20 can be provided with a permanent connection to a light fixture, electrical receptacle, or like electrical product. Such a permanent connection may or may not utilize a quick wire securing apparatus, however, a quick wire securing apparatus would be provided for making other connections to quick connection junction box 10. Connection element 20 can be permanently or removably secured to lower casing 11. However, as described above, connection element 20 is preferably not secured to lower casing 11 at all, but maintained in quick attachment junction box 10 by wire capture sleeve 50. Although the connection element can take on a number of forms, for simplicities sake, only one connection element 20 has been described, illustrated and referenced throughout the figures and this specification.

Figure 2:
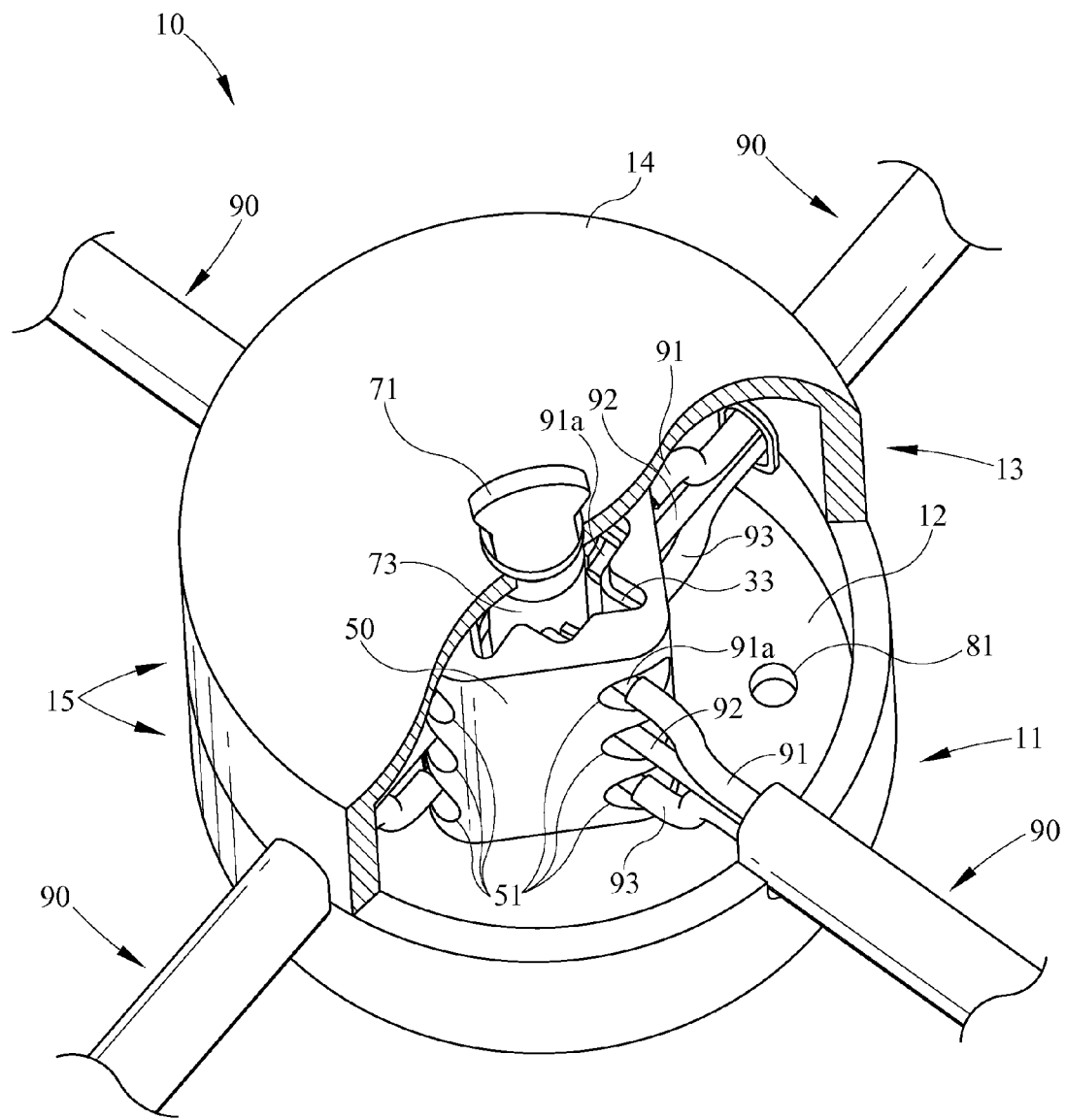
FIG. 2 is a top perspective view of the quick attachment junction box of the present invention with a portion of the upper casing broken away to show part of the interior of the junction box.
Figure 5:
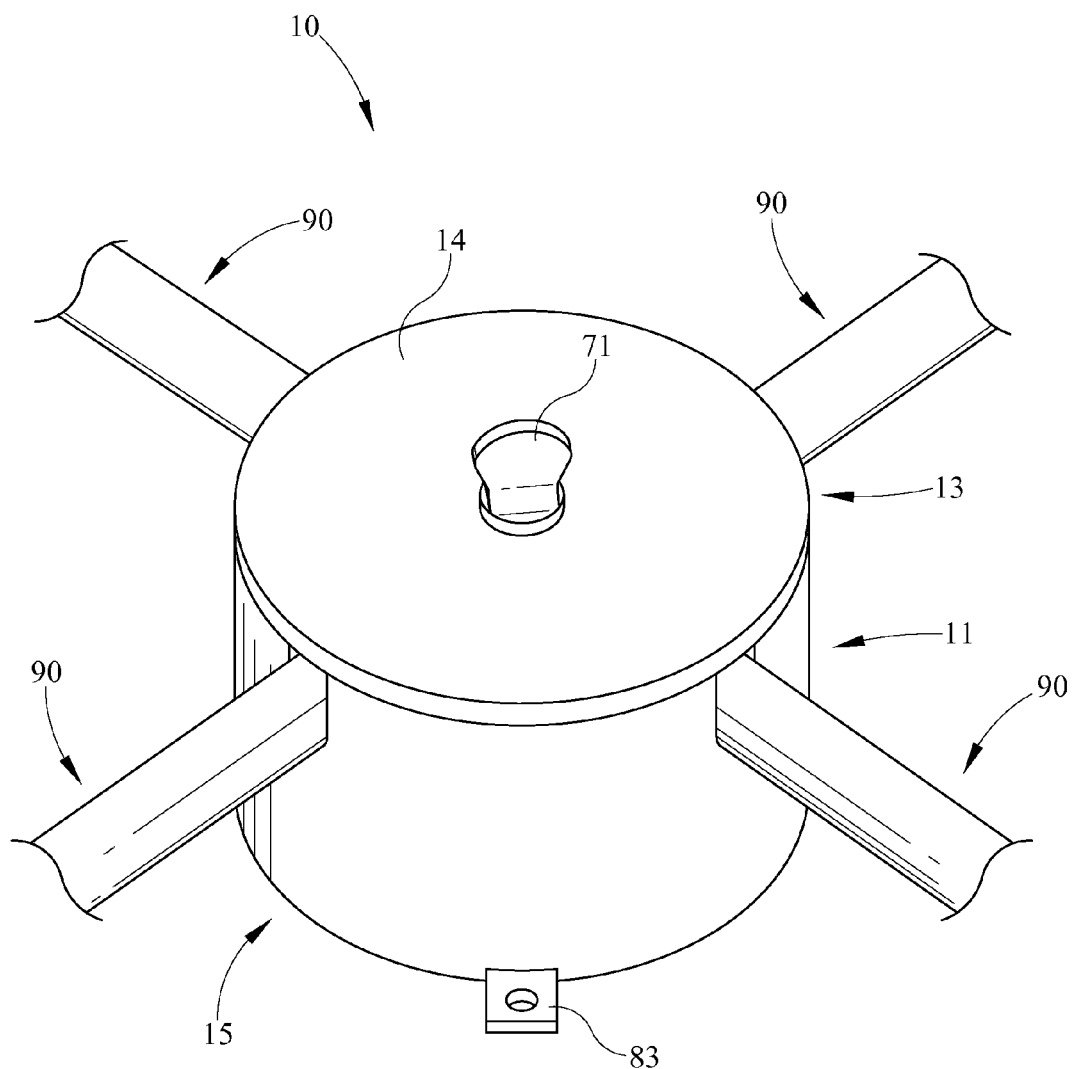
FIG. 5 is another top perspective view of the quick attachment junction box of the present invention, with the quick attachment junction box in the closed position.

The casing element of quick attachment junction box 10 can be formed from any suitable non-conductive material and comprises an upper casing 13 and lower casing 11. Upper casing 13 and lower casing 11 each have base portions 14 and 12, respectively. For reasons of practicality and space constraints in installation, base portions 14 and 12 are preferably substantially flat, however, they may be domed shape or have other configurations. Additionally, although depicted as having a circular shape, base portions 14 and 12 may also be oval, square, rectangular, pentagonal, hexagonal, octagonal, or any other practicable shape. As described below, all or portions of a sidewall 15 may additionally form part of upper and lower casing 13 and 11. Sidewall 15 comprises the non-conductive material extending from upper base portion 14 to lower base portion 12, when the casing element is in the closed position, and is preferably substantially perpendicular to upper and lower base portions 14 and 12, although sidewall could be somewhat inwardly or outwardly angled. Sidewall 15 is preferably formed from substantially equal parts of both upper casing 13 and lower casing 11, as depicted in FIG. 1 and FIG. 2. However, sidewall 15 may also be substantially formed solely from lower casing 11 as depicted in FIG. 5. Similarly, sidewall 15 could be substantially formed solely from upper casing 13 or formed disproportionately from both upper casing 13 and lower casing 11. Sidewall 15 is depicted as having a cylindrical shape. However, it should be noted that sidewall 15 may take on any number of shapes to conform to the shapes of base portions 14 and 12 as discussed above.

The strain relief element of quick attachment junction box 10 comprises one or more apertures 16 formed in sidewall 15 which can be provided in a number of embodiments. By way of example only, several embodiments of the strain relief element will be described. As depicted in FIG. 1 and FIG. 2, strain relief element preferably consists of a plurality of pairs of arcuate notches alignable to form a plurality of apertures 16, with one arcuate notch in upper casing 13 and the other arcuate notch in lower casing 11. The location of apertures 16 can be adjusted vertically, horizontally, or vertically and horizontally, but still comprising one notch in upper casing 13 and one notch in lower casing 11. Additionally, one notch in each notch pair can be made larger and the other notch smaller, while still being able to form aperture 16 for strain relief of any inserted conduit.

Alternatively, as shown in quick attachment junction box 110 of FIG. 5, a plurality of apertures 16 may be provided formed from notches in lower casing 11 only. The location of these apertures 16 could be adjusted vertically, horizontally, or vertically and horizontally, or the notches can be provided in upper casing 13 only. In any of these described embodiments and in other embodiments, electrical conduit is inserted into the junction box through apertures 16. When the casing element of the quick attachment junction box is closed, frictional contact of any inserted conduit with apertures 16 will limit movement of the inserted conduit and prevent strain on the wires connected within the junction box. In another embodiment, the sidewall 15 may be provided with "knockouts," which can be removed to provide the notches forming apertures 16 for provision of strain relief element. This enables a user to only "knock-out" as many notches for strain relief as desired and eliminates unused openings in the casing element if a user desires to make less than all available connections and use less than all available apertures for strain relief. Also, if quick attachment junction box is provided with a permanent connection to a light fixture, electrical receptacle, or like electrical product, a permanent strain relief or some other strain relief means may be used for the conduit supplying that connection. However, a strain relief element comprising one or more apertures 16 formed in sidewall 15 would preferably be used for the remainder of the connections.

A securing element can be provided to secure bottom casing 11 and top casing 13 and allow for the two to be separated when connections are to be made. The securing element can take on a number of embodiments, but preferably requires no tools for operation. By way of example only, some of the various embodiments of usable securing elements will be described. As depicted in FIGS. 1 and 2, one such securing element comprises a non-conductive thumb screw retaining device 71 that extends though an opening 72 in flat base 14 of upper support 13, through at least a portion internal to connection element 20, to be received in a boss 73 formed in or attached to flat base 12 of lower support 11. Boss 73 is placed so as to not interfere with the operation of connection element 20, and can be formed from or coated in a non-conductive material, or surrounded by insulating material in order to prevent any unintended electrical connection with connection element 20. Boss 73 could also be formed in or through a member attached to the upper surface of wire capture sleeve 50, or other appropriate locations. When screw retaining device 72 is appropriately tightened, it causes upper and lower casings 13 and 11 to be secured in frictional contact. When screw retaining device 71 is loosened and removed from boss 73, it allows upper and lower casings 13 and 11 to be separated for further connections therein.

Figure 4:
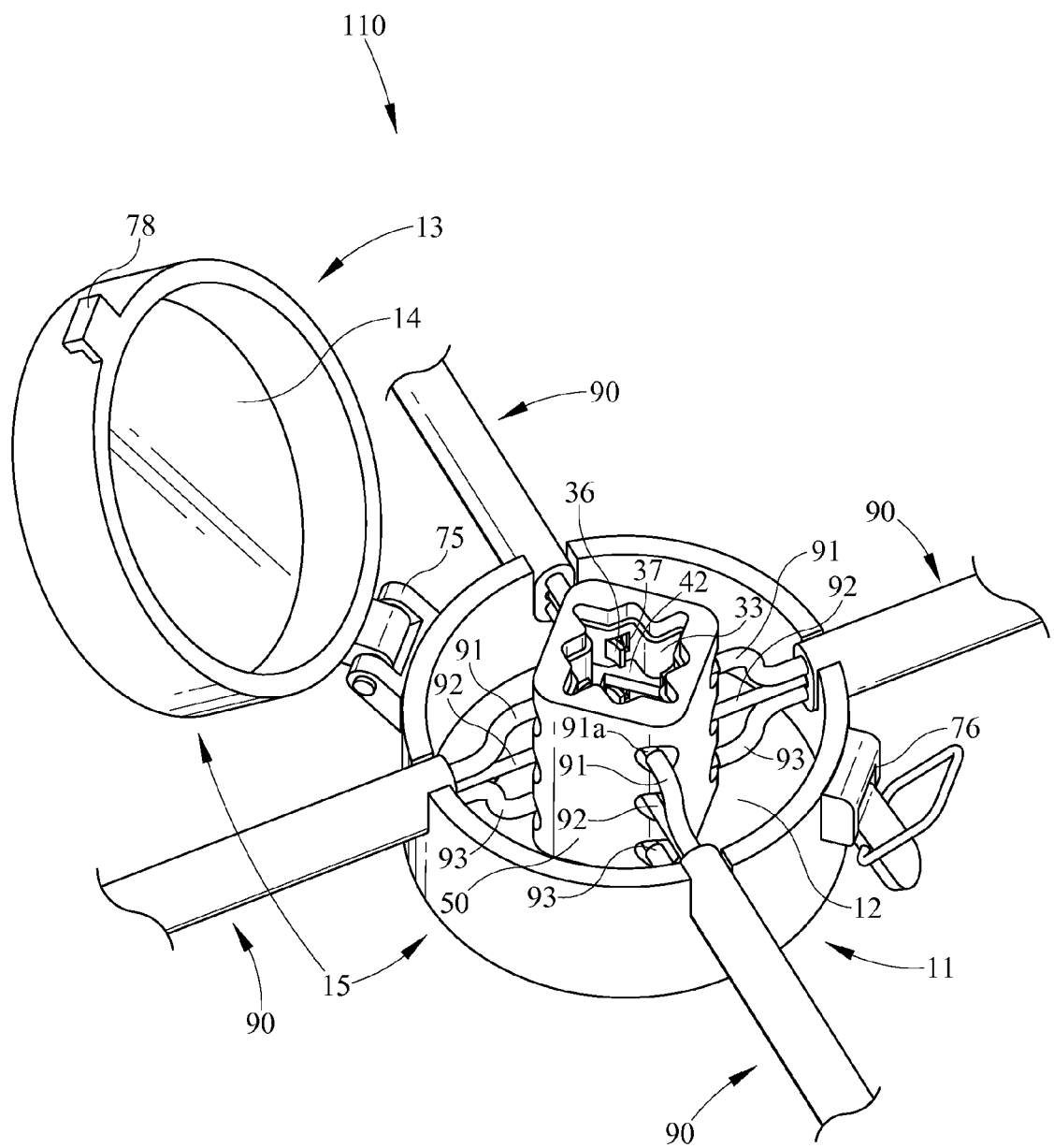
FIG. 4 is a top perspective view of another embodiment of the quick attachment junction box of the present invention, with the upper casing hingedly detached from the lower casing.

Another example of a securing element is depicted in FIG. 4 and comprises a hinge 75, connected to both upper and lower casings 13 and 11. Hinge 75 enables upper and lower casings 13 and 11 to alternate between open and closed positions. A latch retaining device 76 and latch 77 can also be provided on upper and lowers casings 13 and 11 to prevent casings 13 and 11 from being unintentionally separated. Alternatively, the securing element may consist of a plurality of latch retaining devices 76 and corresponding latches 77 only, thereby eliminating the need for a hinge 75. Other variations of these securing elements can also be utilized.

An attachment element can be utilized to attach the quick connection junction box to a variety of surfaces. As depicted in FIG. 3, the attachment element preferably consists of a plurality of attachment apertures 81 through lower casing 11, capable of receiving nails, screws, or other appropriate hardware to attach quick attachment junction box 10 to a desired surface. Attachment apertures 81 can be located in lower casing 11, in sidewall 15, or in both, to support a variety of mounting applications. The attachment element could alternatively comprise a plurality of opposed tabs 83, extending from the base of lower casing 11, in position to be secured to a surface by nails, screws, or other appropriate hardware.

It is understood that while certain forms of the invention have been illustrated and described, it is not limited thereto except insofar as such limitations are included in the following claims and allowable functional equivalents thereof.

The invention claimed is:

1. A quick attachment junction box for capturing and electrically connecting a plurality of electrical wires, comprising:
   a junction box casing having an upper base portion, a lower base portion, and a sidewall in between, said junction box casing being separable along said sidewall into an upper casing and a lower casing;
   a wire capture sleeve having at least one wall said wire capture sleeve retained by and non-rotatably mounted in said junction box casing and having a continuous and uninterrupted open internal area and a plurality of apertures extending through said at least one wall into said open internal area;

a plurality of multi-sided quick connection elements non-rotatably mounted in said open internal area of said wire capture sleeve, each of said quick connection elements having a plurality of apertures;

wherein each of said apertures of each said quick connection element is conductive and electrically connected to any such additional apertures of said quick connection element; and wherein at least one of said apertures of said wire capture sleeve is aligned with at least one aperture of said quick connection elements.

2. The quick attachment junction box for capturing and electrically connecting a plurality of electrical wires of claim 1, wherein said plurality of apertures of at least one of said quick connection elements are each bounded on a first side by a large capture arm and an opposite side by a small capture arm.

3. The quick attachment junction box for capturing and electrically connecting a plurality of electrical wires of claim 2, wherein said small and large capture arms are spaced sufficiently to resistively retain an electrical wire inserted through one of said plurality of apertures of said wire capture sleeve and into one of said plurality of apertures of said quick connection element.

4. The quick attachment junction box for capturing and electrically connecting a plurality of electrical wires of claim 1, wherein each of said quick connection elements is a thin strip having at least five sides and is non-rotatably mounted in said internal area of said wire capture sleeve due solely to the exterior of each said at least one quick connection element having substantially the same shape as said internal area of said wire capture sleeve.

5. The quick attachment junction box for capturing and electrically connecting a plurality of electrical wires of claim 1, wherein each of said quick connection elements is separable from any such additional of said quick connection elements and each of said quick connection elements is electrically isolated from any such adjacent of said quick connection elements by an insulating material.

6. The quick attachment junction box for capturing and electrically connecting a plurality of electrical wires of claim 4, wherein said upper and lower casing of said junction box casing are hingedly connected and retained in the closed position via a latch device.

7. A junction box device, comprising
a casing element,
said casing element having an upper base portion, a lower base portion, and a sidewall in between, said sidewall containing one or more apertures sized to receive electrical wiring;
said casing element being separable along said sidewall into an upper casing and a lower casing;
a connection element,
said connection element being internal to said casing element and having a plurality of quick connection elements,
each of said quick connection elements being constructed from a conductive material and being electrically isolated from any adjacent of said quick connection elements and containing a plurality of electrically connected wire receiving apertures;
an open ended wire capture sleeve,
said wire capture sleeve being retained by and non-rotatably mounted in said casing element and constructed from an insulating material,
said wire capture sleeve having a continuous open internal area receiving said connection element and shaped to prevent rotational movement of said connection element,
said wire capture sleeve having a plurality of apertures at least some of said apertures of said wire capture sleeve substantially corresponding with the location of at least some of said wire receiving apertures of each of said quick connection elements, wherein said apertures of said wire capture sleeve are sized to allow a single electrical wire to pass therethrough.

8. The junction box device of claim 7, wherein said connection element is removable from said wire capture sleeve.

9. The junction box device of claim 8, wherein each of said quick connection elements is separable from any such additional of said quick connection elements and each of said quick connection elements is electrically isolated from any adjacent of said quick connection elements by an insulating material.

10. The junction box device of claim 9, wherein said insulating material is an insulating washer separable from said quick connection elements and removably received in said wire capture sleeve.

11. The junction box device of claim 7, wherein said wire capture sleeve is located in the center of said lower base portion of said casing element.

12. The junction box device of claim 7, wherein said one or more apertures in said sidewall of said casing element are arcuate notch pairs, with one notch of each said arcuate notch pair being in said upper casing of said casing element and the other notch of each said arcuate notch pair being in said lower casing of said casing element, wherein said arcuate notch pairs are in interference fit with any electrical conduit inserted through said arcuate notch pairs when said casing element is in the closed position.

13. The junction box device of claim 7, wherein said upper and lower casing of said casing element are hingedly connected and retained in the closed position via a latch device.

14. A junction box device, comprising
a casing element,
said casing element having an upper base portion, a lower base portion, and a sidewall in between;
said casing element being separable along said sidewall into an upper casing and a lower casing;
a connection element,
said connection element being internal to said casing element and having one or more multi-sided quick connection elements,
each said quick connection element being constructed from a conductive material and being electrically isolated from any adjacent such quick connection element and containing a plurality of electrically connected wire receiving apertures, each of said plurality of wire receiving apertures being constructed to removably receive a single electrical wire;
an open ended wire capture sleeve,
said wire capture sleeve being retained by and non-rotatably mounted to said casing element and constructed from an insulating material,
said wire capture sleeve having a continuous open internal area slidably receiving said connection element and generally corresponding in shape to said connection element so as to prevent rotational movement of said connection element,
said wire capture sleeve having a plurality of apertures at least some of said apertures of said wire capture sleeve substantially corresponding with the location of at least some of said wire receiving apertures of each of said quick connection elements, wherein said apertures of said wire capture sleeve are sized to allow a single electrical wire to pass therethrough;

a strain relief element, said strain relief element being one or more apertures in said sidewall of said casing element that cause portions of said top casing and said bottom casing to be in interference fit with any electrical conduit inserted in said apertures in said sidewall of said casing element when said casing element is in the closed position.

15. The junction box device of claim 14, wherein said upper and lower casing of said casing element are hingedly connected and retained in the closed position via a latch device.

16. The junction box device of claim 15, wherein said upper casing and said lower casing comprise equivalent portions of said upstanding sidewall.

17. The junction box device of claim 15, wherein said connection element is removable from said wire capture sleeve.

18. The junction box device of claim 16, wherein said one or more apertures in said upstanding sidewall of said casing element are arcuate notch pairs, with one notch of each said arcuate notch pair being in said upper casing of said casing element and the other notch of each said arcuate notch pair being in said lower casing of said casing element, wherein said arcuate notch pairs are in interference fit with any electrical conduit inserted through said arcuate notch pairs when said casing element is in the closed position.

19. The junction box device of claim 14, wherein said upper and lower casing of said casing element are separable and connected via a retaining screw, said retaining screw extending through an aperture in said upper base portion of said casing element, and removably received in a boss connected to said lower casing, wherein said upper and lower casing are secured in the closed position when said retaining screw is received in said boss.

20. The junction box device of claim 14, wherein said lower casing comprises the entirety of said sidewall.

21. The junction box device of claim 14, wherein said connection element is removable from said wire capture sleeve.

22. The junction box device of claim 21, wherein each of said quick connection elements is separable from additional quick connection elements and each of said quick connection elements is electrically isolated from adjacent quick connection elements by an insulating material.

23. The junction box device of claim 14, wherein each said wire receiving aperture of said quick connection element is bounded on a first side by a large capture arm and an opposite side by a small capture arm.

24. A junction box for quick attachment of wires, comprising:

an open interior area within said junction box;

a wire capture sleeve having at least one wall vertically mounted in said open interior area and having a keyed uninterrupted internal space and a plurality of apertures extending through said at least one wall of said sleeve;

a plurality of keyed polygonal quick connection elements removably received within said keyed internal space of said sleeve to prevent rotating of said quick connection elements and also having apertures positionally matching said plurality of apertures of said sleeve.

25. The junction box of claim 24 wherein each aperture in said keyed quick connection elements has a wire retention element to retain a wire inserted into said aperture in said keyed quick connection elements.

26. The junction box of claim 24 wherein said wire retention element is a small arm and an angled large arm.

27. The junction box of claim 24, wherein said quick connection elements are separated by an insulating washer removably received in said wire capture sleeve.

* * * * *